United States Patent [19]

Nettleton et al.

[11] Patent Number: 4,825,557
[45] Date of Patent: May 2, 1989

[54] METROLOGICAL APPARATUS WITH PROTECTIVE HOUSING AND AUTOMATIC ACTUATION

[75] Inventors: David Nettleton; Jayantilal A. Patel, both of Leicester; Alan G. Merrills, Hinckley, all of United Kingdom

[73] Assignee: Rank Taylor Hobson Limited, United Kingdom

[21] Appl. No.: 66,090

[22] Filed: Jun. 23, 1987

[30] Foreign Application Priority Data

Jun. 27, 1986 [GB] United Kingdom ............... 8615772

[51] Int. Cl.$^4$ .............................................. G01B 7/28
[52] U.S. Cl. ...................................... 33/502; 33/558; 33/549; 33/553; 73/431
[58] Field of Search ............... 33/553, 503, 504, 556, 33/558, 549, 550, 555, 561, 530; 73/431

[56] References Cited

U.S. PATENT DOCUMENTS

| | | | |
|---|---|---|---|
| 2,422,034 | 6/1947 | Mustonen | 33/553 |
| 3,162,051 | 12/1964 | Peters | 73/431 |
| 3,250,012 | 5/1966 | Hilton et al. | 33/505 |
| 3,307,267 | 3/1967 | Barr et al. | 33/556 |
| 3,857,185 | 12/1974 | Hoglund | 33/553 |
| 4,315,432 | 2/1982 | Newton | 73/431 |
| 4,603,487 | 8/1986 | Matsunato | 33/503 X |

FOREIGN PATENT DOCUMENTS

| | | |
|---|---|---|
| 1313460 | 3/1983 | Fed. Rep. of Germany . |
| 899285 | 6/1962 | United Kingdom . |
| 2057689 | 4/1981 | United Kingdom . |
| 1599153 | 9/1981 | United Kingdom . |
| 2169706 | 7/1986 | United Kingdom . |

Primary Examiner—William D. Martin, Jr.
Attorney, Agent, or Firm—Lerner, David, Littenberg, Krumholz & Mentlik

[57] ABSTRACT

A metrological instrument includes an inductive transducer having a stylus, all being disposed within a protective housing. Upon initiation of the measuring operation, the transducer is moved so that the stylus moves round an endless path such that the stylus is first projected at a high speed from the housing, is thereafter moved to engage the workpiece surface, is then moved at relatively slow speed across the workpiece surface for performing the measurements, and, following completion of the latter movement, is retracted at a high speed into the housing. These movements are effected by a series of cams driven by a single motor. Such an instrument may be located next to a production line without risk of damage and may used for the checking of each of a multiplicity of identical components produced in a mass production process.

32 Claims, 12 Drawing Sheets

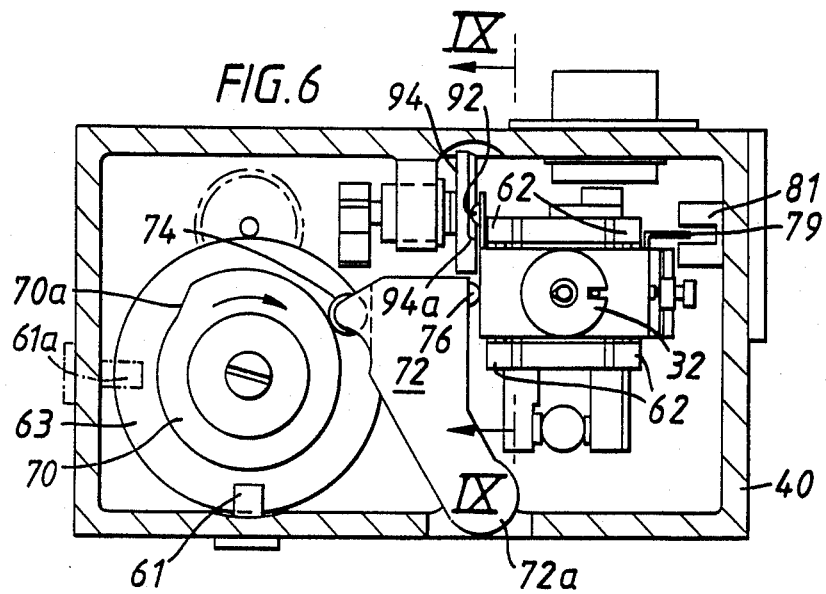
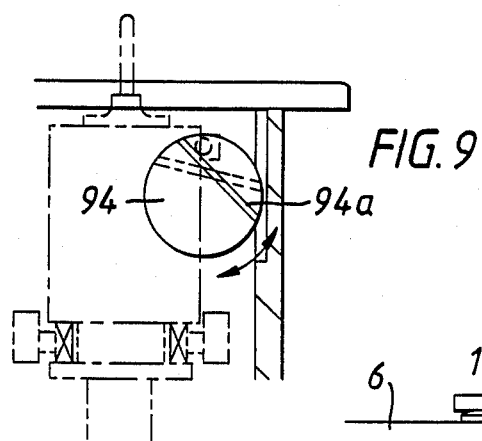
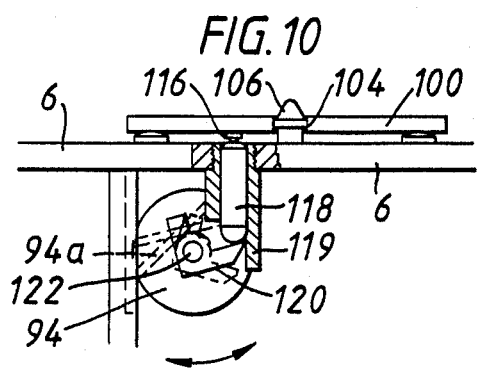

METROLOGICAL APPARATUS WITH PROTECTIVE HOUSING AND AUTOMATIC ACTUATION

This invention relates to metrology and is particularly concerned with instruments which may measure characteristics of workpieces such as surface radius, form or surface texture.

When manufacturing precision components it is desirable, to check their surfaces to ensure that they meet the specification required by the ultimate user. Such checking is performed by metrological instruments which are delicate and highly sensitive and which, in order to protect them against accidental damage, have traditionally been located in a special measuring room located away from the production line. As a consequence, it has been necessary to transport the components to be checked from the production line to the measuring room and then to return them to the production line for further processing. This is time consuming and accordingly costly and there is therefore a need for improving the efficiency of the measuring operations particularly in situations where identical components are manufactured in large numbers and every one desirably should be checked. Traditionally, the development of metrological instruments has concentrated on increasing their accuracy and on increasing the speed of operation by improving the routines performed in the measuring operation, which routines are computer controlled in modern instruments. This approach to increasing speed has, of course, only resulted in reducing the time taken in the measuring operation itself.

An object of the present invention is to provide a radical increase in the efficiency with which a multiplicity of identical components can be checked.

In one aspect, the invention provides a metrological instrument in which a sensor for checking the surface of a workpiece is arranged for movement between a retracted position in which it is located in a protective housing an an operative position in which it is projected from the housing for engagement with the surface of the workpiece to be checked.

In another aspect, the invention provides a metrological instrument having a drive means which is operable to move a sensor along or around a predetermined path repeatedly, for performing measurements on a succession of identical workpieces. In a preferred embodiment, means is provided for setting the mechanism into any one of a plurality of conditions, each providing a respective different said predetermined path to enable the instrument to be used for checking different components.

A further aspect of the invention is the provision of an instrument which is operable to perform a predetermined measuring cycle in response to actuation of a single start button, in order to permit performance of said cycle repeatedly on a succession of similar workpieces.

In another aspect, the invention provides an instrument having first means for inputting set up instructions and/or data and second means separate from said first means for initiating repeatedly a predetermined measuring cycle. The second means is preferably a single button. The first means is preferably a terminal which is detachable from the instrument.

In a further aspect, the invention provides a process for producing a multiplicity of identical workpieces in which a metrological operation is performed on at least the majority of said manufactured workpieces.

The invention is described further by way of example with reference to the accompanying drawings, in which:

FIG. 6 is a diagrammatic sectional view on line VI—VI shown in FIG. 3;

FIG. 9 is a diagrammatic partial sectional view on the line IX—IX OF FIG. 6;

FIG. 10 is a diagrammatic part sectional view of the portion of the instrument shown in FIG. 9, but seen from the opposite direction;

Figure 1:
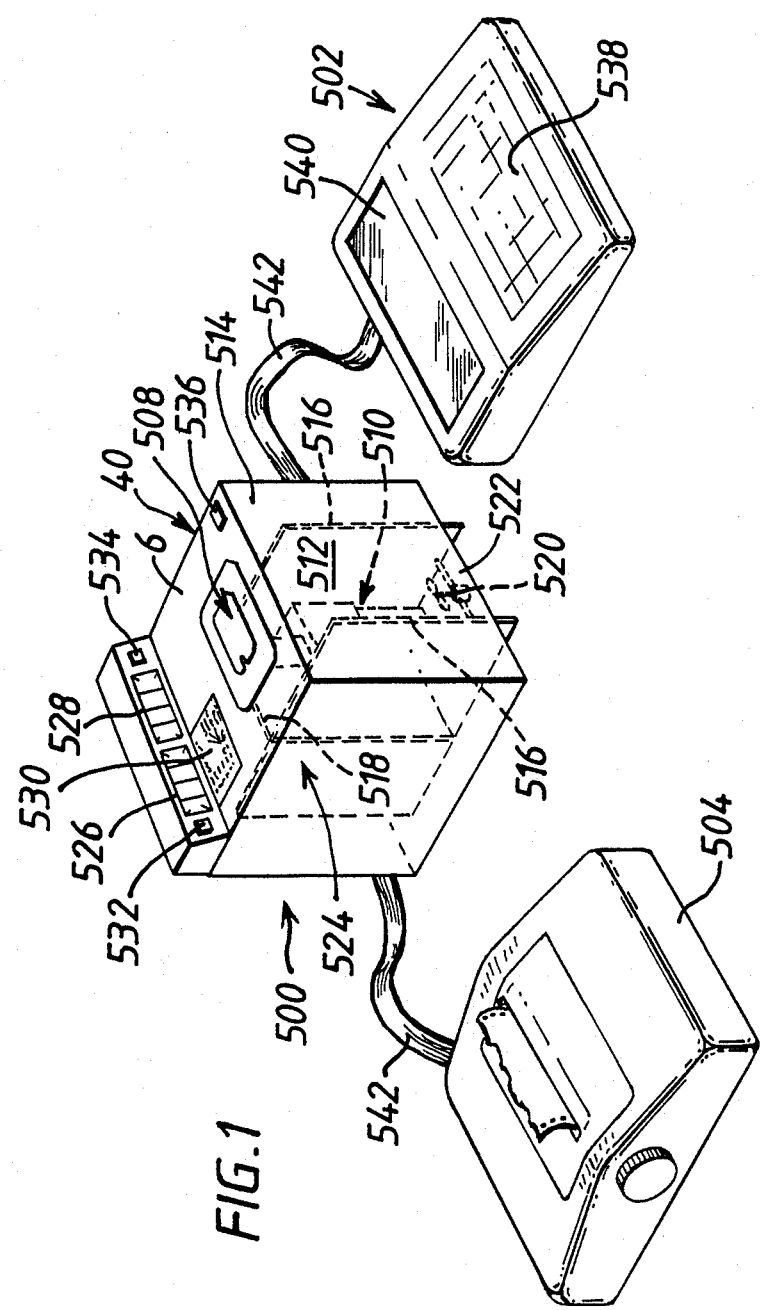
FIG. 1 is a diagrammatic perspective view of an instrument in accordance with a preferred embodiment of the invention.

With reference to FIG. 1, the instrument comprises a main unit 500, a terminal 502 and a printer 504.

The unit 500 comprises a housing 506 on the top 6 of which a workpiece support structure 508 is mounted and which contains measuring instrumentalities 510. The structure 508 and instrumentalities 510 will be described in more detail with reference to the other drawings. The instrumentalities 510 are located in a compartment 512 defined between the front wall 514 of the housing 506, a pair of side partitions 516 and a transverse partition 518. A fan 520 located in the compartment 512 draws ambient air into the compartment 512 from below the housing 506 through an aperture in the bottom wall 522 thereof and this air is caused to pass over the instrumentalities 510 and exit over the upper edges of the partitions 516, which edges are spaced below the top 6 of the housing 506. Electrical and electronic circuitry (not shown in FIG. 1) is located in a compartment 524 towards the rear of the housing 506. The air passing through the compartment 512 due to the action of the fan 520 maintains the instrumentalities 510 at ambient temperature and avoids them being heated up by warm air from the compartment 524. This arrangement has been found particularly advantageous in stabilising the accuracy of the instrument since, it has been found, the air movement described rapidly brings the instrument to a stable condition. In this connection, changes in the temperature of the instrumentalities 510 can cause thermal expansion or contraction thereof which in turn could lead to inaccurate measurements.

Forward facing digital displays 526 and 528 are mounted towards the rear of the housing 506. An information display plate 530 is positioned in front of the display 526 to indicate the significance of the appearance on display 526 of certain numerical codes. Switches 532, 534 and 536 are provided respectively for turning the power on and off, for activating the printer 504 to cause it to print the results of a measuring operation, and for initiating a measuring operation.

The terminal 502 includes a keyboard 538 and a liquid crystal display 540 which is capable of displaying graphics and text The terminal 502 and printer 504 are each connected to the unit 500 by disconnectable data cables 542.

The following more detailed description of the construction and operation of the preferred embodiment of the invention will be on the assumption that the instrument is to be used for measuring a concave toroidal surface of a ball-race.

Figure 2:
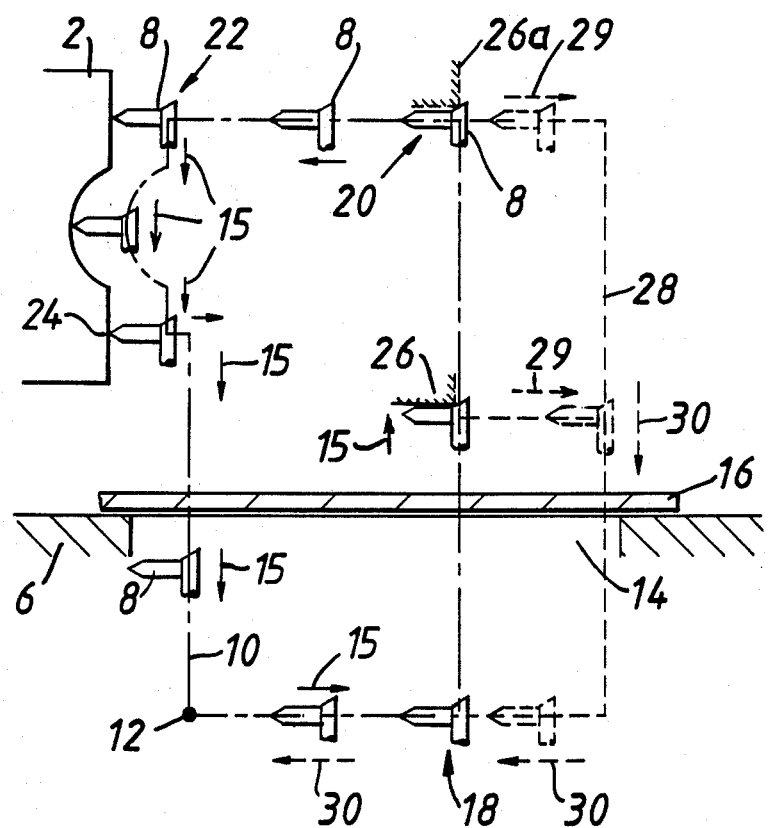
FIG. 2 is a diagram illustrating the principle of operation of the preferred embodiment of the invention.

With reference to FIG. 2, a ball race 2 has a concave toroidal surface 4 whose radius and form is to be checked by the instrument according to the preferred embodiment of the invention, and is one of a multiplicity of such ball-races which are manufactured by a mass production process and every one of which is to be checked. The metrological instrument for carrying out this checking is constructed so that it may be positioned on a work bench (not shown) immediately adjacent the production line with substantially no risk of damage and is arranged for performing at high speed and at a high repetition rate a measurement cycle which is specifically suited to the particular ball-race 2 to be checked.

The structure 508 includes a jig (not shown in FIG. 2) on which the ball-race 2 is supported. A stylus 8 (only the tip of which is visible in FIG. 2) is arranged to be moved once in each measuring cycle around a closed path indicated by chain dotted lines 10 in FIG. 2. When the instrument is inoperative, the stylus 8 is located at the position 12 in which it is retracted into the housing. At this time, an aperture 14 provided in the top 6 is covered by a shutter 16 and accordingly the stylus is fully secure against accidental damage. When the instrument is activated, the stylus is caused to move around the path 10 in the direction indicated by the arrows 15. Thus, firstly the stylus is moved generally horizontally in a direction away from the workpiece from position 12 to position 18 and then it is moved vertically through the opening 14 to position 20, the shutter 16 having previously been moved to a position clear of the opening 14. The stylus then moves generally horizontally towards the workpiece to position 22 where it engages the surface of the ball-race 2. Thereafter, the stylus is moved downwardly again whilst the tip is held in contact with the surface to be checked. During the downward movement, the output of the transducer with which the stylus is associated is detected to enable the required measurements to be made. When the stylus reaches point 24, it is moved a short distance horizontally to the right as seen in the drawing so as to disengage the tip from the workpiece surface, and then returned to position 12, thereby completing the cycle. The movement of the stylus between points 22 and 24 is carried out at a speed suitable for taking measurements, which is relatively slow. The movement between other points, particularly between points 18 and 20 and points 24 and 12 is carried out of high speed in order to minimise the time taken for performance of the whole cycle. When the stylus has been returned to position 12, the shutter 16 is again moved to cover the opening 14.

If, during movement between points 18 and 20, the stylus encounters an obstruction such as indicated at 26 or 26a, the instrument senses this and the stylus is firstly caused to move horizontally to the right as shown by arrows 29 in the drawing i.e. away from the workpiece location and then to be withdrawn into the housing of the instrument and returned to the position 12 along the path 28 shown in broken lines, as indicated by the arrows 30.

Figure 3:
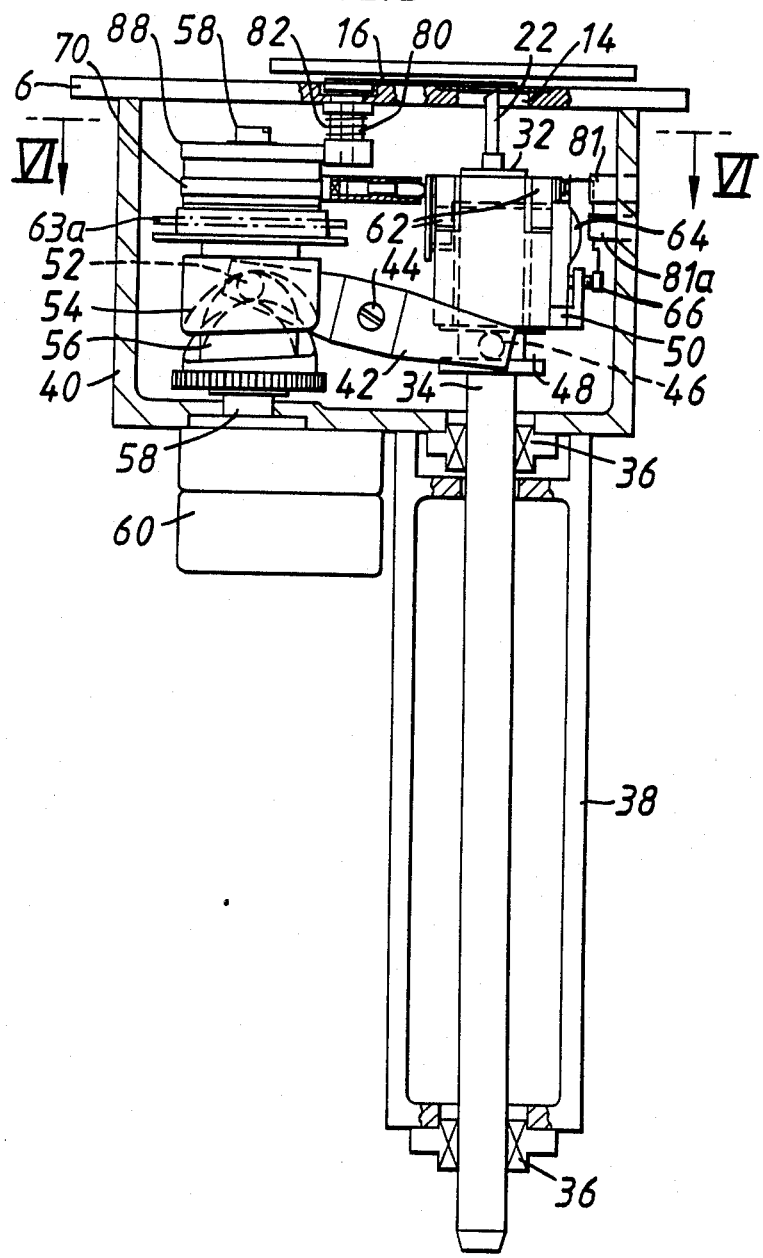
FIG. 3 is a cross section through part of the preferred embodiment of the present invention.
Figure 4:
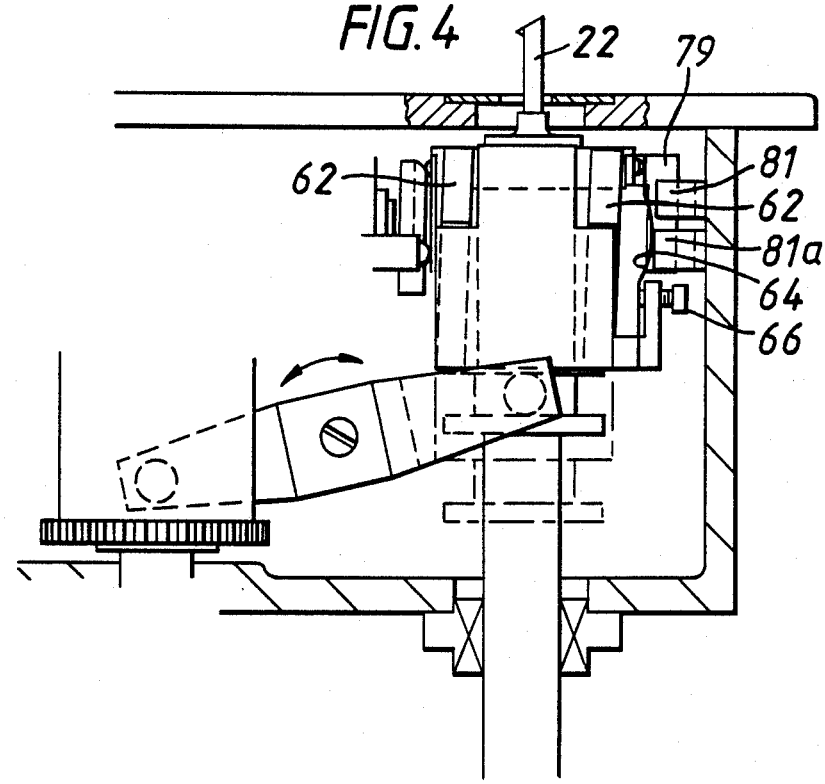
FIG. 4 is a cross section similar to FIG. 3 but showing the instrument in a different condition.
Figure 5:
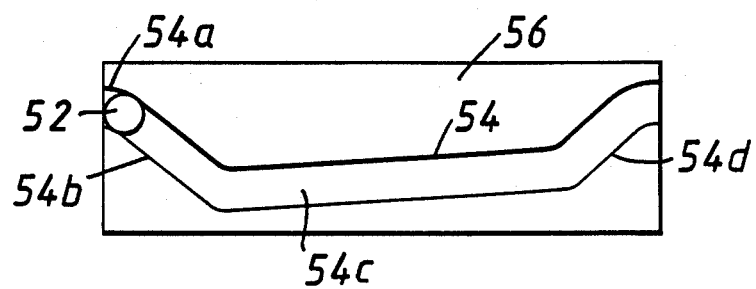
FIG. 5 is a developed view of a cam track included in the instrument of FIGS. 3 and 4.

With reference to FIGS. 3 to 6, the stylus 8 is carried by an inductive transducer 32 which is mounted at the upper end of a vertically reciprocable rod 34 slidable in bearings 36 which are located at opposite ends of a tubular enclosure 38, the latter being fixed in the a housing 40 which contains the transducer 32 and whose top 6 is illustrated in FIG. 2. Vertical reciprocation of the rod 34 and therefore the transducer 32 is achieved by a lever 42 which is pivoted at its centre 44 to the housing 40 and has a fork 46 at one end engaged in a groove 48 of a transducer support structure 50 and a peg 52 at its opposite end engaged in a slot 54 of a cam 56 which is secured to a vertical spindle 58 driven by a constant speed motor 60. As the spindle 58 is rotated, the lever 42 rocks from the position shown in FIG. 3 to that shown in FIG. 4, moving the stylus from position 18 to position 20 and then rocks back to the position shown in FIG. 3 to move the stylus from the position 22 back to the position 12. The shape of the cam slot 54 is illustrated in FIG. 5. When the peg 52 is in the portion of the cam 54a, the stylus is in position 12. When the cam 56 rotates so that the peg 52 moves down the steep portion 54b of the slot 54, the stylus 22 is moved rapidly from position 18 to position 20. Portion 54c of the slot 54 slopes gently upwardly so that as the cam 56 rotates, at constant speed, the transducer moves slowly and at constant speed from position 22 towards position 24. Thus, during this constant speed movement, the stylus 22 traverses the surface under test. At a predetermined point shortly after the beginning of this traversal a signal is generated, for initiating data logging, by a optical sensing unit 61a (FIG. 6) which responds to light passing through a slit (not shown) in a disc 63a (see particularly FIG. 3) which is secured for rotation with the shaft 58. When the transducer 32 reaches position 24, the peg 52 enters the portion 54d which rises steeply so that the transducer 8 is moved rapidly from position 24, after disengagement from the workpiece surface, back to position 12. As seen in FIG. 6, an optical sensing unit 61 detects a slit (not shown) formed in a disc 63 secured to spindle 58, to deenergize motor 60 when the stylus returns to position 12 i.e. after one revolution of spindle 58.

The transducer 32 is carried on the structure 50 by a parallel linkage which permits generally horizontal movement of the transducer whereby the stylus is carried from position 12 to position 18 and from position 20 to position 22. The parallel linkage comprises links 62 which extend generally vertically and have their upper ends pivotally connected to the transducer 32 and their lower ends pivotally connected to the structure 50. A vertically extending leaf spring 64 having its lower end secured to the structure 50 and its upper end engaging the transducer 32 urges the transducer 32 to the left as seen in FIGS. 3 and 4. The force of the spring is adjustable by a screw 66 and the arrangement is such that the transducer 32 is maintained in its left most position whilst the stylus 22 is traversing the surface under test.

Movement of the transducer 32 to the right so that the stylus moves from position 12 to position 18 is achieved by a cam 70 which is secured to the spindle 58 and acts on the transducer 32 through a lever 72 pivoted at one end 72a to the housing 40 and carrying at its other end a roller 74 in engagement with the cam 70 and a low friction projection 76 in engagement with the transducer 32. Thus, as the spindle 58 is rotated by the motor 60 to begin the upward movement of the rod 34, the cam 70 also rotates so as to move the transducer 32 to the right. It will be appreciated that although the movement of the stylus from position 12 to position 18 is shown as horizontal in FIG. 2 it will include an upward component with the mechanism illustrated in FIGS. 3 to 5. When the stylus reaches position 20, surface portion 70a of cam 70 comes to the roller 74, thus permitting the transducer 32 to move to the left.

If, during upward movement from position 18 to position 20, the stylus 8 encounters an obstruction such as 26 as illustrated in FIG. 2, the transducer 32 is deflected to the right. This is assisted by the provision of a chamfered surface 8a at the upper end of the stylus 8. The parallel linkage 62 is constructed to provide for this movement. Upon this movement to the right, a plate 79 carried by the transducer 32 moves into an optical sensing unit 81 which generates a signal that is used to put the motor 60 into reverse so that the stylus is promptly withdrawn back into its protective housing 40, thus minimising the risk of damage due to such an obstruction.

Figure 7:
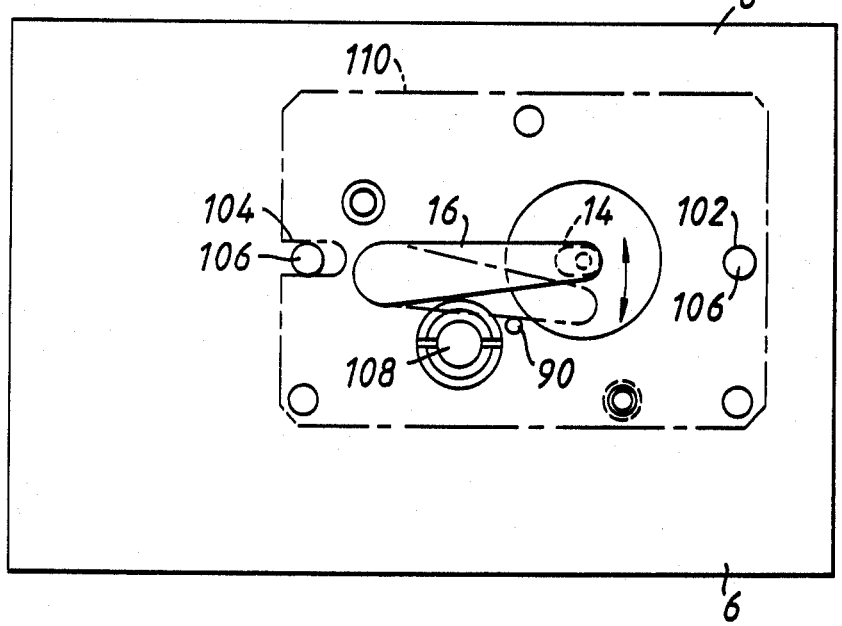
FIG. 7 is a plan view of the instrument shown in FIG. 3.
Figure 8:
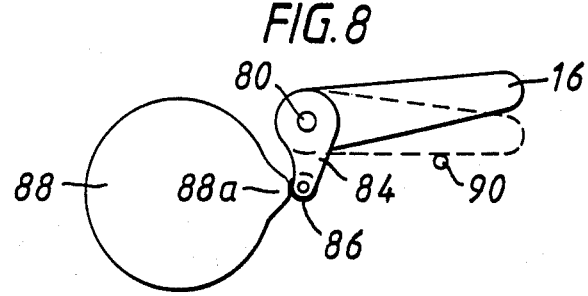
FIG. 8 is a diagram illustrating the operation of a part of the instrument shown in FIG. 7.

As best seen in FIGS. 3, 7 and 8, the shutter 16 is fixed to one end of a spindle 80 which is surrounded by a torsion spring 82 biasing the shutter 16 to the position in which the aperture 14 is open. The lower end of the spindle 80 carries a lever 84 having a roller 86 thereon which is engaged by a cam 88 which is secured to the spindle 58. A raised portion 88a of the cam 88 is positioned thereon such that it engages the roller 86 when the spindle 58 is in the position in which the transducer 32 is fully lowered and the stylus 8 is accordingly withdrawn into the housing 40. Upon rotation of the spindle 58 at the beginning of a measuring cycle, the portion 88a of the cam 88 moves away from the roller 86 permitting the torsion spring 82 to move the shutter to its open position shown in broken lines in FIGS. 7 and 8, in which position it engages a stop 90.

Movement of the stylus 8 out of contact with the workpiece surface at position 24 is achieved by a low friction follower 92 (FIG. 6) carried by the transducer 32 which engages a normally stationary cam 94 seen best in FIGS. 6, 9 and 10. The cam 94 includes a step 94a arranged so that as the follower 92 rides up the step, the transducer 32 is moved to the right so that the stylus 8 moves out of contact with the workpiece surface and the cooperation between the follower 92 and the cam 94 maintains the stylus 8 out of contact with the workpiece surface as the stylus 8 moves from position 24 to position 12. The vertical location of position 24 is adjustable by rotating the cam 94 about its horizontal axis as can be seen in FIGS. 9 and 10. Once the position of the cam 94 has been set in dependence upon a workpiece to be measured, it will remain in the set position for the measurement of all identical workpieces. If, however, a workpiece of different size, for example, is to be checked, the cam 94 may be rotated to a new position to adjust the vertical location of position 24 so that the stylus is withdrawn from the workpiece surface after the required position of the surface has been measured. This movement of the transducer to the right is detected by an optical detector 81a which detects a projecting portion 79a of the plate or blade 79.

Figure 11:
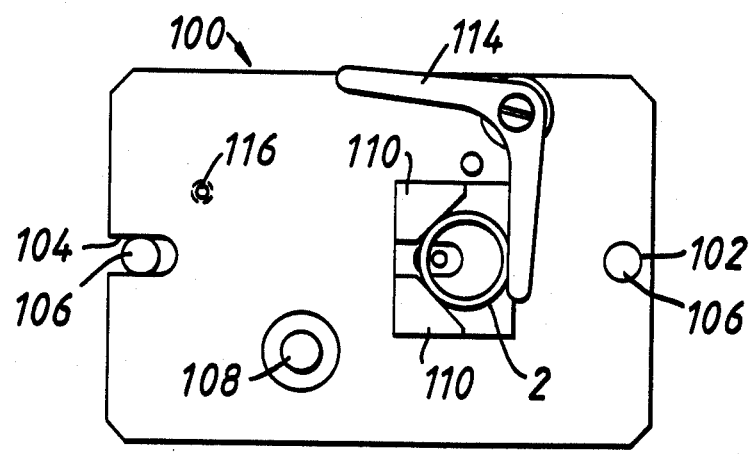
FIG. 11 is a plan view of a removable jig with which the instrument is provided.
Figure 12:
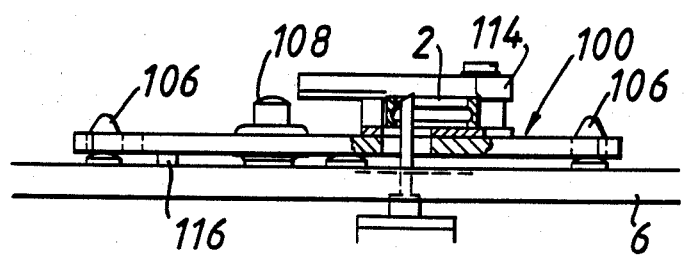
FIG. 12 is a side view, partly in section, of the jig of FIG. 11, showing it mounted on the instrument.

In order to accommodate different workpieces and to set the position of the cam 94 in accordance with the workpiece to be checked, the instrument is provided with a number of different jigs or adaptors each designed for a specific workpiece. One such jig is indicated at 100 in FIGS. 7 and 10 to 11. Each jig 100 is formed with an aperture 102 and a slot 104 which receive respective pins 106 secured to the top 6 of the housing 40 for accurately locating the jig in the required position and a rotatable fixing device 108 (not shown or described in detail) is provided for securing the jig to the top 6. Each jig has positioning abutments 110 dimensioned and shaped to precisely position a workpiece of predetermined size in relation to an opening 112 in the jig through which the stylus 8 may pass when projected from the housing 40. A spring loaded lever 114 is provided for holding the workpiece 2 in position in engagement with the abutments 110. Each jig has a downwardly projecting pin 116 which is for setting the rotary position of the cam 94 in accordance with the dimensions of the workpiece to be supported by the jig. The pin 116 is secured in the jig 100 by screw threads (not shown) whereby its vertical position may be adjusted when setting up the jig for a particular size of workpiece. The pin 116, as shown in FIG. 10, engages a plunger 118 which is slidable in a sleeve 119 supported by the top 6 and the lower end of which engages a lever 120 fixed to a shaft 122 on which the cam 94 is mounted. Spring biasing means is provided (not shown) for biasing the shaft 122 in the anti-clockwise direction as seen in FIG. 10.

Figure 13:
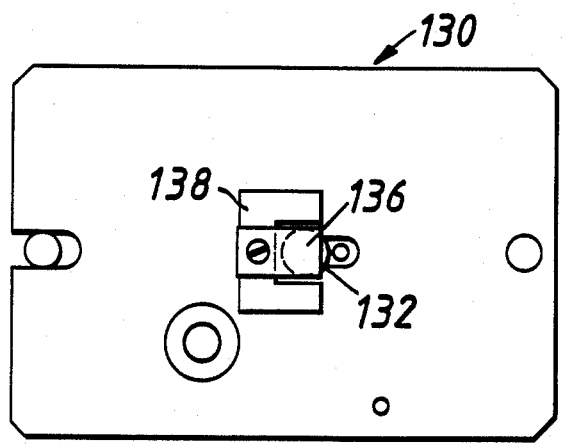
FIG. 13 is a plan view of an alternative jig for use in calibrating the instrument.
Figure 14:
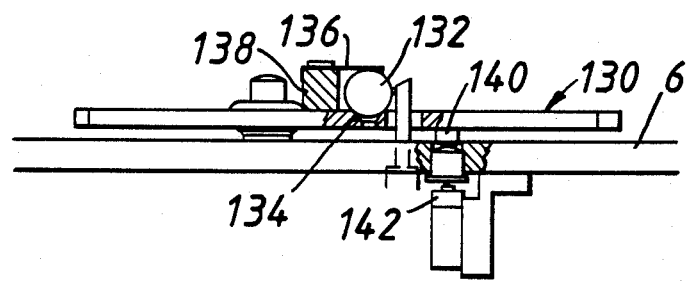
FIG. 14 is a side view, partly in section, of the jig of FIG. 13 showing it in position on the instrument.

FIGS. 13 and 14 show a jig 130 which is used for calibrating the instrument. It is identical to the jigs 100 except that it does not include the abutments 110 nor lever 114 and instead is provided with a high precision ball 132, such as a high precision ball-bearing, located in an accurately positioned depression 134 and held in position by a leaf spring 136 secured to a block 138 on top of the jigs 130. The jig 130 is provided with an element 140 which acts on a microswitch 142 located on the underside of the top 6 of the housing 40 for setting the instrument into the calibration mode when the jig 130 is mounted thereon. Accordingly, calibration may be easily effected as frequently as necessary.

Figure 15:
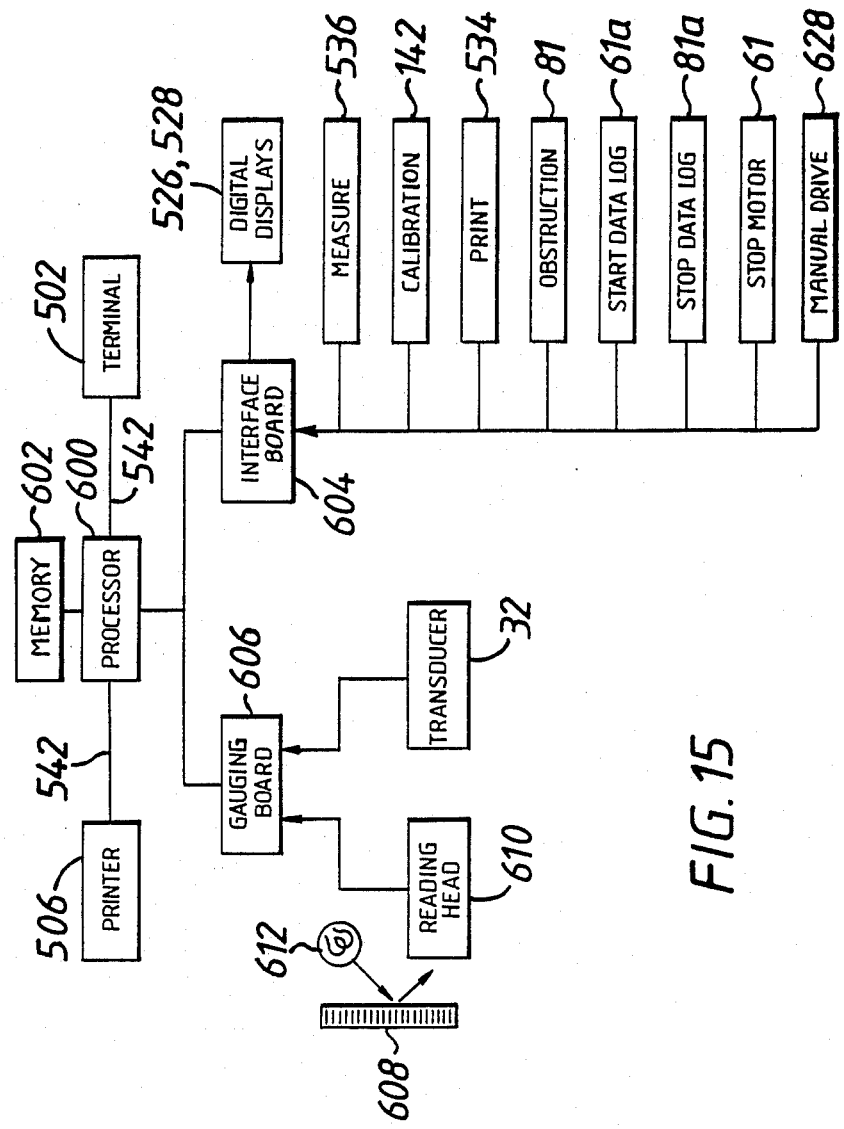
FIG. 15 is a block diagram of electronic circuitry included in the preferred embodiment of the invention.
Figure 16:
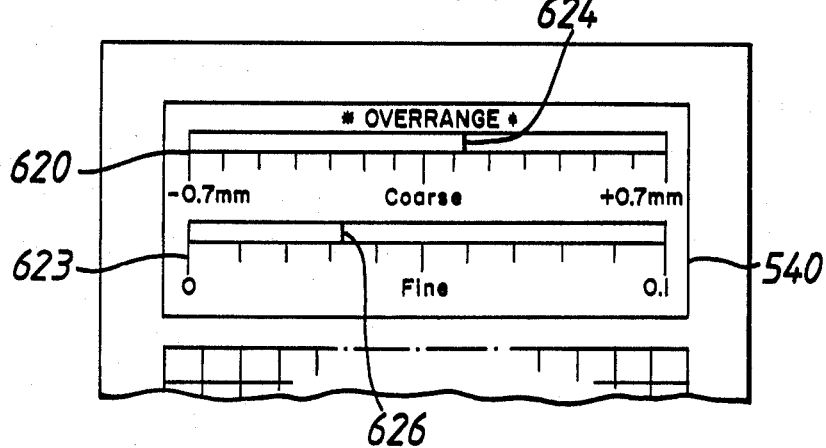
FIG. 16 shows a display produced on a display device included in the preferred embodiments.

With reference to FIG. 15, the main unit 500 includes a microprocessor 600 which is provided with associated memory 602 and to which the terminal 502 and printer 506 are connected by the cables 542. An interface board 604 supplies control signals to the processor 600 in response to the signals generated by the measure and print buttons 534 and 536, the calibration microswitch 142, and the optical sensing units 81, 61a, 81a, 61 respectively for indicating an obstruction, starting data logging, stopping data logging and stopping the motor 60. The interface board 604, under control of the microprocessor 600, also supplies signals to the digital displays 526 and 528.

A guaging board 606 receives the analogue output signal from the transducer 32 and converts this to digital form for supply to the microprocessor 600. The output of the transducer 32 is read at equispaced positions of the transducer 32 as it traverses the workpiece surface. This is achieved by a position detecting arrangement, which detects the position of the transducer 32, and which comprises an optical grating 608 and an optical reading head 610, one of which moves with the transducer 32 and the other of which is fixed. The grating 608 is illuminated by a light source 612.

The computer 600 is programmed so that, when the terminal 502 is connected, the instrument is controlled from the terminal 502 and any signals from the measure button 536 or print button 534 are ignored. When the terminal 502 is disconnected, the instrument is controlled by the measure button 536 and print button 534, actuation of the measure button 536 causing the processor 600 to execute a measuring cycle in which the transducer is moved around the endless path illustrated in FIG. 2, data from the transducer is logged and measurements on that data carried out. This is an important aspect of the preferred embodiment of the invention since, using the terminal 502, the instrument can be set up by a skilled operator and, after set up, a relatively unskilled operator can carry out measurements on a succession of workpieces simply by placing the workpieces in the jig and actuating the measure button 536.

When the terminal 502 is connected to the processor 600, various programs may be entered with the assistance of menus displayed on the display 540. An example of a preferred main menu is as follows:

1. Measure/Calibrate
2. Results
3. Set Up
4. Input Parameters
5. Print Profile
6. Print Summary In order to set up the instrument for use with a succession of identical workpieces it is necessary firstly to select an appropriate jig 100 and secondly to adjust the position of the pin 116 so as to define the location of position 24 at which the stylus 8 is moved out of contact with the surface of the workpiece in a measuring cycle. Thus, after selection of the jig this is mounted on the instrument and then an example of the mass produced workpiece (ball-race 2) to be tested is mounted in the jig. Item 3 is selected from the main menu and this causes a program to be entered in which coarse and fine scales 620, 622 are displayed on the liquid crystal display 540 together with movable pointers 624 and 626 which are associated respectively with the coarse and fine scales 620, 622 and provide a visual representation of the deflection, in millimeters, of the stylus 22, this deflection being obtained by the processor 600 from the magnitude of the signal generated by the inductive transducer. The coarse scale 620 indicates a deflection from a null point in positive and negative directions and comprises graduations representing 0.1 mm. The fine scale 626 comprises graduations representing deflections of 0.01 mm. A manual drive button 628 (FIG. 15) is provided for causing the processor 600 to turn the motor on or off under control of the skilled operator setting up the instrument. This button 628 is preferably located at a position on the instrument where it is not readily accessible by the relatively unskilled operatives who will carry out tests on mass produced workpieces. Using button 628, and watching the movement of the pointers 624 and 626, the operator setting up the instrument can cause the transducer to move around the endless path shown in FIG. 2 and, by means of the pointers, can observe the deflection of the stylus as it traverses the workpiece surface, including the concave portion, and as the transducer is moved away at position 24. Preferably, position 24 is located only a short distance below the end of the concave portion of the ball-race 2 and thus, with the aid of the button 628 and scales 620 and 622, the position of projection 116 is adjusted to provide the required location for position 24 only a short distance below the end of the concave surface. In this way, the stop data log signal may be generated by unit 81a without unnecessary delay so that the processor 600 may begin to carry out the required calculations on the data collected without any unnecessary delay, these calculations beginning in response to the signal from unit 81a. The speed of operation of the instrument may be enhanced.

Before using the instrument, it is also necessary to input certain parameters. This is achieved by selecting item 4 from the main menu, in response to which the input parameters table is displayed. A preferred example of this is as follows:

1. Units (metric/imperial)
2. Ignore percent (0 . . . 30)
3. Stylus tip radius (5–99 microns)
4. Print format (profile/summary)

Figure 19:
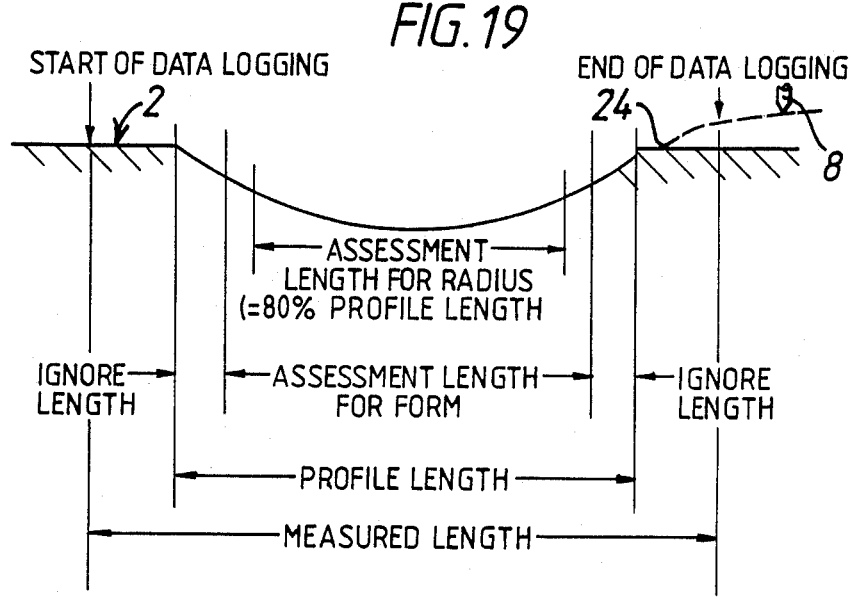
FIG. 19 is a diagram to assist in understanding the performance of the measuring operation in the preferred embodiment.

Using this table the operator first enters the units in which measurements are to be made. Next he enters the so-called "ignore length". This will be understood from FIG. 19 which shows the ignore length at the beginning and end of the concave profile being measured. Thus, up to 30% of the profile length may be ignored in the calculations performed. The particular figure selected will depend upon the workpieces to be checked. FIG. 19 also shows the position 24 and, in broken lines, the path of the stylus tip after leaving the workpiece surface.

Thereafter the radius of the stylus tip is entered and then the required print format i.e. whether a trace of the profile is required or whether merely a numerical print of the radius and the peak to valley measurement (P-V) is required.

Figure 18:
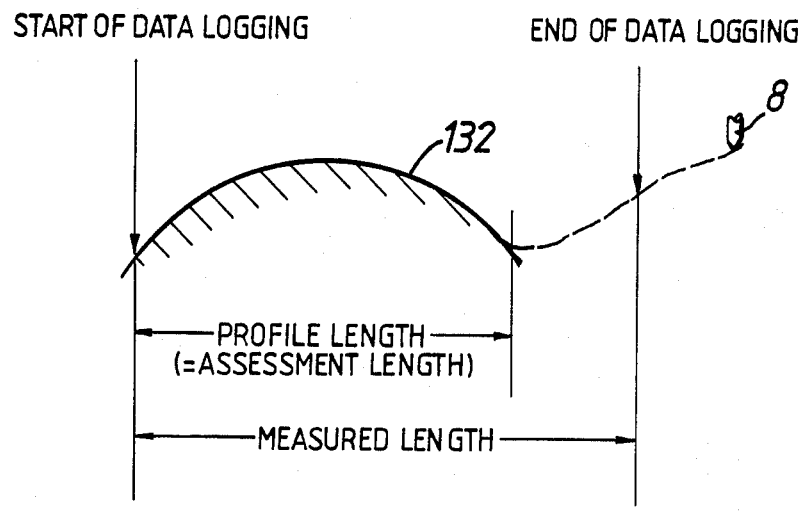
FIG. 18 is a diagram for assisting in understanding a calibration operation performed in the instrument of the preceding drawings.

After the instrument has been set up as described above, it necessary to calibrate it before it is used. Calibration should in fact be regularly carried out for example once a day even though the set up is not changed. In order to calibrate the instrument, the calibration jig with the calibration ball (FIG. 14) is mounted on the instrument. Calibration may then be performed with by selecting item 1 from the main menu (if the terminal is connected) or simply by pressing the measure button 536. FIG. 18 illustrates the portion of the ball surface traversed in calibration, the path of the stylus tip after leaving the ball surface being shown in broken lines. The instrument is preprogrammed with the radius and form of the calibration ball 132 and thus, from this and from the data obtained in the calibration cycle, the instrument carries out the required calculations to effect calibration. These may be performed in a well known manner and accordingly do not require further description.

Figure 17:
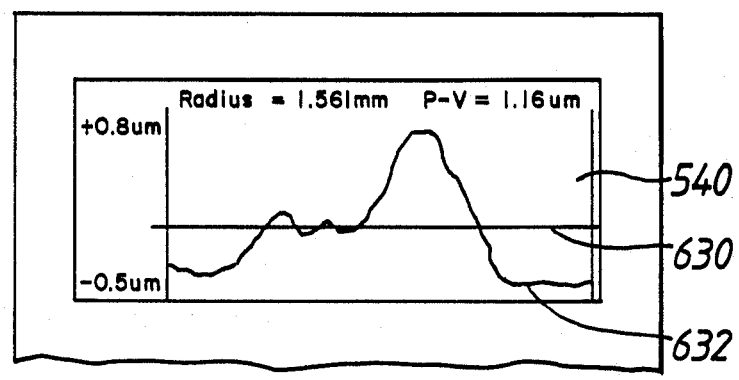
FIG. 17 shows another form of display which may be produced.

Item 2 from the main menu enables display of past results stored in the instrument and items 5 and 6 provide instructions for printing a profile or printing a summary regardless of which was selected from input parameter 4.

Where measurements are carried out with the terminal connected, the results are displayed on the display 540 in the form shown in FIG. 17 in which the horizontal straight line 630 represents the radius of the surface, the trace 632 represents the form errors and radius and P-V measurements are displayed at the top of the display as shown. In addition, regardless of whether the terminal 502 is connected, radius is displayed in display 526 and P-V is displayed in display 528.

From the foregoing description, it will be understood that once the instrument has been set up and calibrated, it may be used to check a succession of identical workpieces with an efficiency which has not hitherto been achieved. In particular, a relatively unskilled operator simply has to place each workpiece in the jig and actuate the measure button. Actuation of the measure button causes the measuring cycle to be commenced this involving movement of the stylus around its endless path with initially rapid projection, speed change to a speed suitable for data logging, traversal of the workpiece for data logging purposes, lifting away from the workpiece surface which movement initiates the data calculation programs in the computer and thereafter rapid retraction to its rest position within the protective housing. Following the calculations performed on the data which has been logged, the computer displays the radius and P-V values on the two digital displays 526 and 528, from which the operator can tell whether or not the workpiece is acceptable. A preferred routine to be followed by the computer in the measuring cycle is as follows:

1. Data log.
2. Filter data.
3. Detect edges of curved surface to determine profile length.
4. If calibrating, calculate calibration constants.
5. Calculate arcuate compensation.
6. Utilising 80% of the profile length, calculate radius.
7. Subtract radius from results obtained.
8. Taking into account the ignore length, calculate peak-valley.
9. Display results.

All of this may be carried out within a cycle taking only a few seconds so that several workpieces per minute may be checked. With the preferred embodiment of the invention, as applied to measuring ball-races, a throughput of four workpieces per minute may be achieved.

It will be appreciated from the foregoing description that the instrument, will, at different times, be in different states. Preferably, the state in which the instrument is at any given time is indicated by a numerical code displayed on digital display 526. And preferably the code is indicated on the indicator plate 530. An example of a suitable code is as follows:

1. Ready state. In this state, the instrument is in a standby mode.
2. Measuring state. The instrument is in this state when a jig 100 is provided and a measurement cycle is being executed in response to an instruction from the measure button or from the terminal.
3. Calibrating. This is as 2 but with the calibration jig in place in the instrument.
4. Printing. This is self-explanatory.
5. Terminal in use. This is self-explanatory.
6. Error. The particular error which has arisen is preferably indicated by additional digits, such as:
   001 not calibrated.
   002 manual switch 628 in use.
   003 obstruction.
   004 over-range condition.
   005 edge of profile not detected.
   006 printer not ready.

The provision of this status code indication on the top of the machine adjacent the digital display enhances the efficiency of the machine and its suitability for use by relatively unskilled operators.

Figure 20:
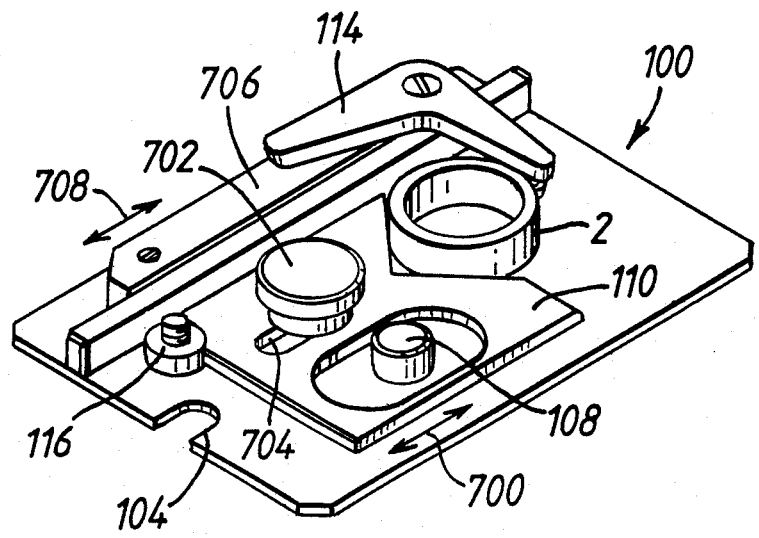
FIG. 20 is a diagrammatic perspective view of an alternative form of jig which may be used in the preferred embodiment.

FIG. 20 illustrates a modified form of jig which may be adjusted for taking ball-races of different sizes. In FIG. 20, the element 110 is adjustable in the direction of the arrow 700 by loosening a knob 702 having a threaded shank (not shown) which passes through a slot 704 in the element 110. Further, the lever 114 is mounted on a block 706 which is slidable in the direction of arrow 708 and can be clamped in the selected position by means not shown. Thus, by adjusting the position of the plate 110 and the block 706, ball-races of different sizes can be accommodated and correctly located in relation to the endless path which the stylus 22 folows during a measuring cycle.

Many modifications may be made within the scope of the invention. For example, if an instrument is to be used with only one particular type of workpiece, the interchangeable jigs need not be provided and the instrument can be arranged so that the stylus may only follow a single predetermined path. Although it is highly preferred that the retracted position of the stylus should be below the jig or support on which the workpiece is mounted, it would alternatively be possible to arrange that the transducer and associated mechanism and the protective housing could be positioned to one side of the location in which the workpiece under test is mounted, in which case the projecting and retracting movement of the stylus could be horizontal instead of vertical. As a further alternative, this mechanism and the protective housing could be provided above the workpiece location. However, it is generally considered that the arrangement shown in the drawings, in which the workpiece is positioned above the protective housing and the workpiece surface under test extends away from the protective housing provides maximum convenience and efficiency in the positioning of the workpieces on the instrument and their removal from the instrument after testing.

It will be appreciated that the cam arrangement shown, in which a number of cams are mounted on a single spindle driven by a single motor, provides an advantageous mechanism for effecting the major movements of the stylus and in this way an efficient, robust and relatively low cost instrument may be provided. The cams provide the timing of the various movements and since they are secured relative to each other, and in practice may be secured directly together, synchronisation of the movements caused by the cams cannot be lost.

Initiation of the receiving and processing of signals from the transducer may be performed in a variety of different ways, for example by sensing the edge of the concave portion 4 of the workpiece, by sensing contact between the stylus and the workpiece, by sensing a particular angular position of spindle 58 as or in any other suitable manner. Because the stylus is withdrawn into the housing in between measuring operations, risk of damage to the stylus or transducer is substantially eliminated. Because the instrument is set up so that the transducer follows the same path for measuring each of a succession of identical workpieces, and because the movement of the transducer is at high speed when being projected and retracted and at a relatively lower speed suitable for measurement, when in contact with the workpiece, measurements can be completed with maximum efficiency and without interrupting the production flow. Further, where the device is to be used with a number of different workpieces, the inter-changeable jigs provide a simple and efficient means for resetting the instrument for dealing with such alternative workpieces.

Although the instrument has been described with reference to the drawings on the assumption that radius and form are to be measured, it is also possible to provide an instrument in accordance with the invention which is suitable for carrying out other measurements, such as surface texture.

We claim:

1. A metrological instrument for measuring the surface of a workpiece, comprising a protective housing, means connected to said housing for locating a workpiece in a predetermined position relative to said housing, a surface sensor in said protective housing, and drive means coupled to said sensor and said housing for moving said sensor relative to said housing in a measuring cycle, along a predetermined path including first, second and third portions constituting a loop so that in said first portion of said path the sensor is projected from the housing, so that in said second portion of said path the sensor traverses a surface of a workpiece located by said means for locating to perform a measuring operation and so that in said third portion of said path the sensor is retracted into the housing, said drive means including means for causing said sensor to move at a relatively slow speed along said second portion of said path and at a relatively high speed, higher than said relatively slow speed along at least part of at least one of said first and third portions thereof.

2. An instrument according to claim 1, wherein said drive means includes means for projecting said sensor at a relatively high speed along said first portion of said path and means for moving said sensor at a relatively low speed along said second portion of said path during said measuring operation.

3. An instrument according to claim 1, wherein said drive means includes means for moving said sensor relative to said workpiece at a relatively low speed along said second portion of said path during the measuring operation and thereafter retracting said sensor into said housing at a relatively high speed along said third portion of said path.

4. An instrument according to claim 1, wherein said drive means includes means for projecting said sensor from said housing at a relatively high speed along said first portion of said path, then moving said sensor at a relatively low speed along said second portion of said path for performing said measuring operation, and thereafter retracting said sensor into said protective housing along said third portion of said path at a relatively high speed.

5. An instrument according to claim 4, wherein said drive means further includes means for moving said sensor in a direction away from the location of the workpiece surface prior to the beginning of said retracting movement.

6. An instrument according to claim 5, including means for adjusting the point at which the sensor is moved away from the workpiece surface following a measuring operation.

7. An instrument according to claim 6, wherein said means for locating a workpiece includes a removable jig for supporting the workpiece, said jig being arranged to effect said adjustment when attached to the instrument.

8. An instrument according to claim 1, wherein said drive means includes means for moving the sensor in a direction away from the location of the workpiece surface to be measured prior to or during said projecting movement along said first portion of said path and moving the sensor in a direction towards the location of the workpiece surface to be measured after said projecting movement.

9. An instrument according to claim 1, wherein said means for locating a workpiece is located on top of the protective housing.

10. An instrument according to claim 1, wherein said drive means comprises first and second cams rotatable about a common axis and secured relative to each other, a single motor for driving sid cams, and means connecting said cams to said sensor.

11. An instrument according to claim 1, wherein said housing includes an opening and said drive means includes means for moving said sensor through said opening in said projecting and retracting movements, the instrument further including a shutter and means for moving said shutter to a closed position wherein said shutter occludes said opening when the sensor is positioned inside the housing and to an open position before the sensor is projected from the housing.

12. An instrument according to claim 11, wherein said drive means comprises first and second cams rotatable about a common axis and secured relative to each other, a single motor for driving said cams, and means connecting said cams to said sensor; and wherein said means for moving said shutter includes a further cam coaxial with and secured relative to said first and second cams to be driven by said single motor and means for connecting said further cam to said shutter.

13. An instrument according to claim 1, wherein said sensor is a stylus adapted to contact the workpiece surface.

14. An instrument according to claim 1, in combination with a jig for calibrating the instrument and means for detachably securing said jig to the instrument, said jig having a calibration element, the instrument including means to sense the attachment of said calibration jig and initiating a calibration operation wherein said calibration element of said jig is sensed by said sensor responsive to said attachment.

15. An instrument according to claim 1, including obstruction sensing means operable to cause the sensor to be promptly retracted into the protective housing in response to the sensor engaging an obstruction during the projecting movement.

16. An instrument according to claim 15, wherein said obstruction sensing means is operable to sense movement of the sensor in a direction away from the workpiece surface.

17. A metrological instrument comprising a housing, means mounted with respect to the housing for locating a workpiece in a predetermined position relative to said housing, a surface sensor, means for selecting one of a plurality of measuring cycle programs and storing the selected measuring cycle program, drive means mounted with respect to the housing, coupled to the sensor and responsive to the stored measuring cycle program to cause the sensor to perform a measuring cycle determined from the stored program in which the sensor traverses the surface of a workpiece located in said predetermined position, a single manually operable control member and means responsive to manual actuation of said control member for actuating said drive means to initiate said measuring cycle, whereby said cycle can be repeated by repeated manual actuation of said control member.

18. An instrument according to claim 17, further comprising terminal means for inputting program data to said means for selecting and storing.

19. An instrument according to claim 18, wherein said drive means includes means for receiving an instruction to perform said measuring operation from said terminal means and initiating said measurement cycle responsive to such instruction.

20. An instrument according to claim 18, wherein said terminal means is removable and disconnectable from said instrument.

21. A metrological instrument for measuring the surface of a workpiece, comprising a protective housing having a surface defining an opening, means mounted with respect to the housing for locating a workpiece in a predetermined position relative to said housing, a surface sensor disposed in said protective housing, and drive means mounted with respect to said housing and coupled to said sensor for moving said sensor relative to said housing along a predetermined path having first, second and third portions, so that in said first portion said sensor is projected out of said housing to a position adjacent the surface of a workpiece located by said locating means, so that in said second portion said sensor traverses the surface of said workpiece for performing a measuring operation, so that in said third portion said sensor is retracted through sid opening into said housing, and so that during at least part of said second portion the sensor is spaced a substantial distance from said surface of said housing whereby the instrument can measure surfaces of workpieces other than surfaces overlying said surface of said housing.

22. An instrument according to claim 21, wherein said drive means includes means for projecting said sensor at a relatively high speed along said first portion of said path and means for moving said sensor at a relatively low speed along said second portion of said path during said measuring operation.

23. An instrument according to claim 21 wherein said drive means includes means for moving said sensor relative to said workpiece at a relatively low speed along said second portion of said path during the measuring operation and thereafter retracting said sensor into said housing at a relatively high speed along said third portion of said path.

24. An instrument according to claim 21, wherein said drive means includes means for projecting said sensor from said housing at a relatively high speed along said first portion of said path, then moving said sensor at a relatively low speed along said second portion of said path for performing said measuring operation, and thereafter retracting said sensor into said protective housing along said third portion of said path at a relatively high speed.

25. An instrument according to claim 21, wherein said drive means further includes means for moving said sensor in a direction away from the location of the workpiece surface prior to the beginning of said retracting movement.

26. An instrument according to claim 21, wherein said drive means includes means for moving the sensor in a direction away from the location of the workpiece surface to be measured prior to or during said projecting movement along said first portion of said path and moving the sensor in a direction towards the location of the workpiece surface to be measured after said projecting movement.

27. An instrument according to claim 21, wherein said housing includes an opening and said drive means includes means for moving said sensor through said opening in said projecting and retracting movements, the instrument further including a shutter and means for moving said shutter to a closed position wherein said shutter occludes said opening when the sensor is positioned inside the housing and to an open position before the sensor is projected from the housing.

28. An instrument according to claim 27, wherein said drive means comprises first and second cams rotatable about a common axis and secured relative to each other, a single motor for driving said cams, and means connecting said cams to said sensor; and wherein said means for moving said shutter includes a further cam coaxial with and secured relative to said first and second cams to be driven by said single motor and means for connecting said further cam to said shutter.

29. An instrument according to claim 21, wherein said sensor is a stylus adapted to contact the workpiece surface.

30. An instrument according to claim 21, in combination with a jig for calibrating the instrument and means for detachably securing said jig to the instrument, said jig having a calibration element, the instrument including means to sense the attachment of said calibration jig and initiating a calibration operation wherein said calibration element of said jig is sensed by said sensor responsive to said attachment.

31. An instrument according to claim 21, further comprising means responsive to said sensor encountering an obstruction during projection thereof to cause said sensor thereupon to be retracted into said housing.

32. An instrument according to claim 31, wherein said sensor has a chamfered end to cause deflection thereof upon encountering an obstruction.

* * * * *